United States Patent [19]
Olschewski et al.

[11] 4,249,781
[45] Feb. 10, 1981

[54] ROTARY DRILLING BIT WITH CONICALLY SHAPED ROTARY CUTTERS

[75] Inventors: Armin Olschewski; Heinrich Kunkel, both of Schweinfurt; Manfred Brandenstein, Aschfeld; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 966,668

[22] Filed: Dec. 5, 1978

[30] Foreign Application Priority Data

Dec. 14, 1977 [DE] Fed. Rep. of Germany ....... 2755591

[51] Int. Cl.³ .......................... F16C 19/00; E21B 4/02; E21B 10/22
[52] U.S. Cl. .................................... 308/8.2; 175/227; 175/372; 308/187.1
[58] Field of Search ................ 308/8, 8.2, 36.1, 187.1, 308/37, 135; 175/371, 372, 227–229; 277/177

[56] References Cited
U.S. PATENT DOCUMENTS

| | | | |
|---|---|---|---|
| 2,759,777 | 8/1956 | Anderson | 277/177 X |
| 3,127,942 | 4/1964 | Neilson | 308/8.2 |
| 3,307,645 | 3/1967 | Hildebrandt | 175/372 |

FOREIGN PATENT DOCUMENTS

| | | | |
|---|---|---|---|
| 1053319 | 9/1953 | France | 308/8.2 |
| 7603835 | 10/1977 | Netherlands | 308/8.2 |

*Primary Examiner*—Stuart S. Levy
*Attorney, Agent, or Firm*—Eugene E. Renz, Jr.

[57] ABSTRACT

A rotary drilling bit with conically shaped rotary cutters which are supported in bearings on the drilling bit body by a plurality of bearings. At least one seal is provided in each rotary cutter for separating the bearing cavities of the bearings.

6 Claims, 3 Drawing Figures

ROTARY DRILLING BIT WITH CONICALLY SHAPED ROTARY CUTTERS

BACKGROUND OF THE INVENTION

The present invention relates to drilling apparatus used in the exploration for petroleum products and more specifically to a rotary drill bit for such apparatus having conically shaped rotary cutters which are supported by a plurality of bearings on the drill bit body.

Typically the bearing arrangement supporting the cutter on the drill bit body includes friction bearings adjacent the tip of the body and rollers remote from the tip. These bearings are usually lubricated by filling the common bearing cavity which is sealed at its outer end with a single lubricant. An arrangement of this type is illustrated in U.S. Pat. No. 3,127,942. The seal which seals the bearing cavity at the roller end is commonly a sliding seal ring which tends to wear during operation of the rotary drill bit so that after a predetermined operation period, leakage losses of the lubricant occur. In the event these lubricant leakage losses are not continuously replaced with new quantities of lubricant, only a small residual amount remains in the bearing cavity. This small residual amount of lubricant is carried by centrifugal force to the end of the rotary cutter facing the rotary drill bit as the result of the rotating motion of the conical rotary cutter. Accordingly, the bearings at the opposite end near the tip of the conical rotary cutter are deprived of lubricant.

Additionally, the tip of the rotary drill bit has a higher running temperature in operation than the end facing the drill bit body which is wetted down more thoroughly and better cooled by the cooling cutting liquid in the rotary drill bit area. The lubricant filling the common bearing cavity must, therefore, be of the type designed for the very high running temperature at the end of the rotary cutter facing away from the drill bit body even though a normal lubricant, suitable for lower operating temperatures which often has a greater lubricating ability and is, therefore, more economical may be adequate for the bearing or bearings at the opposite end facing the drill bit body. Lubrication of the bearings of the known rotary drilling bit, therefore, is expensive. Furthermore, it is not optimally designed for the different running temperatures of the bearings, the rolling elements and/or the friction bearings.

SUMMARY OF THE PRESENT INVENTION

It is, therefore, an object of the present invention to provide an improved rotary drill bit generally of the type described above which is trouble free in operation and is of a construction and arrangement minimizing lubricant leakage losses and which yet at the same time is capable of withstanding high operating temperatures thus providing a drill bit of long, useful service life. In accordance with the present invention, the rotary drill bit is of relatively simplified construction and, therefore, can be manufactured and assembled economically. In accordance with the present invention the above objectives are achieved by separating the bearing cavities by providing at least one internal seal in each rotary cutter. By this arrangement the seal divides the bearing cavity for example, into one chamber for the sliding bearings and the other for the rolling bearings. By reason of this, a lubricant may be selected for each of the bearing cavities which is suited to the different running temperatures of the bearings and maintain the lubricants isolated. This eliminates the possibility of mixing of the lubricants which may impair the lubricating ability thereof. Moreover, when small leakage losses do occur at the end of the rotary cutter facing the drill bit body, the seal prevents lubricant in the bearing cavity or chamber at the tip of the rotary cutter from migrating or being carried by centrifugal force resulting from the rotating motion of the rotary cutter toward the end facing the rotary drill bit body and escaping to the outside.

In accordance with the one specific embodiment of the invention illustrated, the seal is located in a position to separate the bearing cavity for the sliding or friction bearings from that of the rollers. Consequently the rolling bearing can be lubricated with the type of lubricant best suited for rolling bearings for example grease or oil and the friction bearing can be provided with a separate lubricant most suitable for sliding bearings, for example, solid lubricants. These lubricants are chosen for best operating temperatures of the rolling and sliding bearings respectively. The seal also precludes wear particles or flakes in one bearing cavity from penetrating the other and causing harmful bearing wear.

According to another feature of the present invention, the seal is slidingly mounted in the drill bit body as well as in the rotary cutter. The seal may be fixed in an axial or radial direction in an annular groove in the drill bit body or in the rotary cutter according as illustrated in the embodiments described below.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENTS

Figure 1:
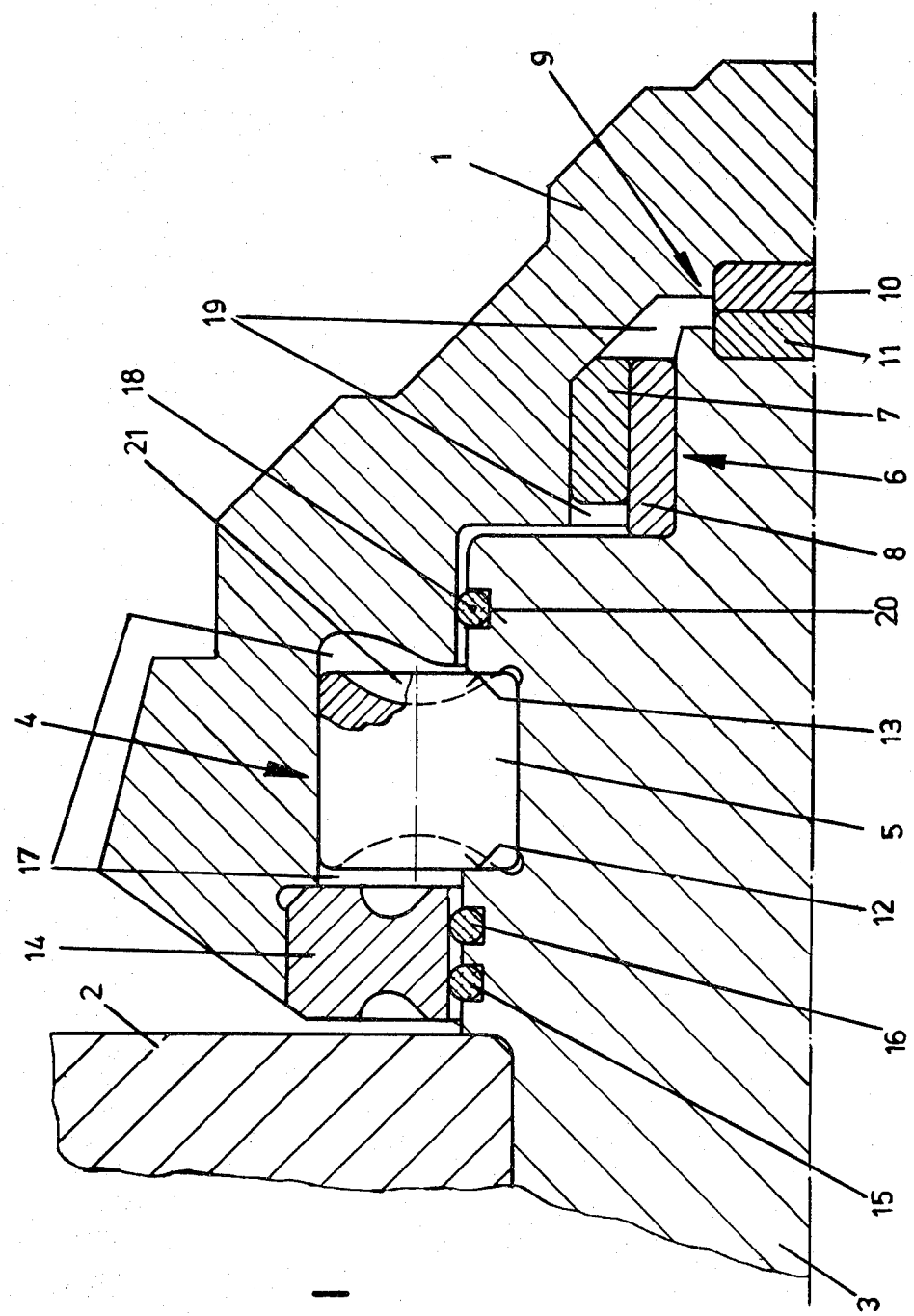
FIG. 1 is a fragmentary transverse sectional view through the rotary cutter of a rotary drill bit incorporating the present invention.

Referring now to the drawings and particularly FIG. 1 thereof, there is shown a conically shaped rotary cutter generally designated by the numeral 1 rotatably supported on a trunnion 3 attached to the drill bit body 2, for example, by welding. In the present instance, the rotary cutter 1 is supported on the trunnion 3 by a roller bearing 4 comprising a plurality of cylindrical rolling elements at one end of the rotary cutter adjacent the drill bit body 2 and at its opposite end by a radial friction bearing 6 comprised of an outer bearing ring 7 and an inner bearing ring 8 and an axial friction bearing 9 consisting of an outer friction disc 10 and an inner friction disc 11.

In the present instance, the trunnion 3 is provided with a recessed inner raceway for the rolling elements defining circumferentially extending lateral guide edges for the cylindrical rolling elements 5. An edge ring 14 is supported on the end of the rotary cutter 1, for example, by electron beam welding so that the rotary cutter 1 is fixed against removal from the trunnion by means of the cylindrical rolling elements 5.

The inner end of the assembly is sealed by two annular rings 15 and 16 which seat in adjacent annular grooves in the trunnion so that they are axially fixed. These sealing rings slide on the trunnion 3 of the drill bit body 2 as well as a bore of the edge ring 14. By reason of the seals 15 and 16, the scavenging liquid which surrounds the rotary cutter 1 cannot penetrate the bearing cavity; and moreover, the lubricating agent which is located in the roller bearing cavity 17 cannot migrate to the radial slot between the edge ring 14 and trunnion 3 and be lost to the area outside the cutting roller.

Seal means is also provided which separates the cavity for the rolling bearings and the sliding bearings. In the present instance the seal means comprises an annular O-ring type seal 18, preferably made of a plastic material, which seats in an annular groove in the trunnion 3 and slides on the trunnion as well as on the interior peripheral surface of the rotary cutter 1 which confronts the groove. As illustrated the O-ring is axially fixed in the annular groove of the trunnion 3. The roller bearing cavity or chamber 17 has an enlarged recess adjacent one axial end of the rollers facing the tip of the rotary cutter to provide an annular pocket for holding an adequately large amount of lubricant. The pocket has a contoured side wall which flares outwardly so that the lubricant contained therein is flung into the axial guiding slot between the rolling elements 5 and the guiding edges 12 or 13 during rotation of the rolling elements and in this way the guiding slot always contains enough lubricant in operation. This is a critical lubrication area.

Considering now the construction and arrangement defined above, before or during operation, the rolling bearing cavity or chamber 17 is filled with a lubricant particularly adapted for rolling bearings, such as oil or grease, so that the rolling bearings operate under optimal lubricating conditions adapted to the existing operating temperatures. On the other hand the friction bearing cavity or chamber 19 which is isolated and separated from the rolling bearing cavity or chamber 17 by the annular seal 18 is filled initially or refilled after a period of use with a different type of lubricant suitable for the radial friction bearings 6 and the axial friction bearing 9. The bearing rings 7, 8 and the friction discs 10, 11 of the friction bearings are preferably made of a hard metal, for example, tungsten carbide and are lubricated with a pure solid lubricant which is especially adapted to the high running temperatures which prevail at the tip of the rotary cutter 1.

Figure 2:
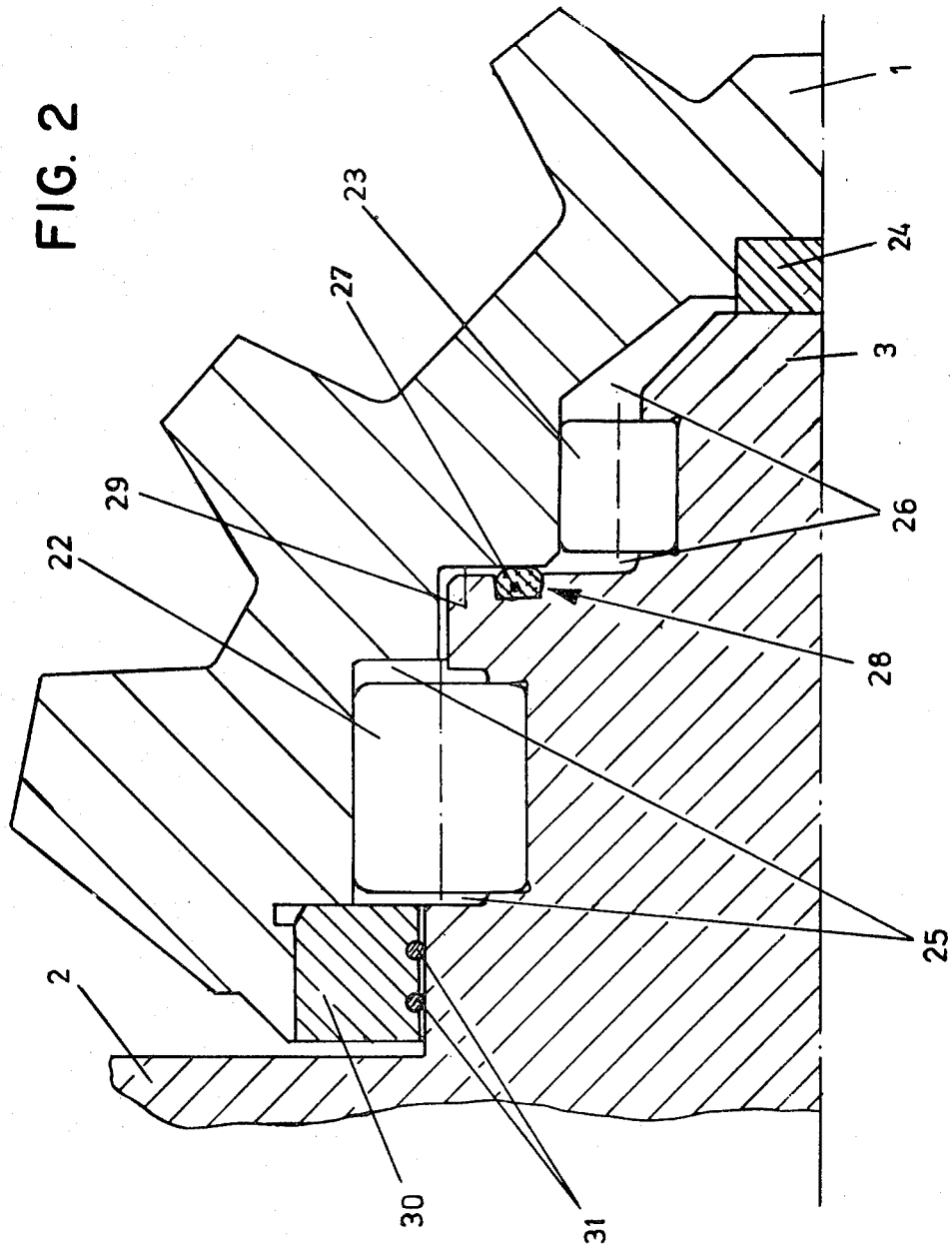
FIG. 2 is a fragmentary sectional view similar to FIG. 1 showing a modified form of rotary drill bit.

There is illustrated in FIG. 2 a modified form of conically shaped rotary cutter in accordance with the present invention. In accordance with this embodiment of the invention, the rotary cutter 1 is radially supported in bearings on the trunnion 3 of the drill bit body 2 comprising a set of roller bearings 22 at the inner axial end of the cutter remote from the tip and an intermediate set of rolling elements 23 disposed between the rolling elements 22 and the tip of the rotary cutter. These rollers engage between recessed raceways in the trunnion and confronting axially directed surfaces forming outer raceways in the interior peripheral surface of the rotary cutter 1. A friction bearing 24 engages between the front end of the trunnion and the tip of the rotary cutter and serves to absorb the axially directed operating pressure of the rotary cutter which slides on the front face of the trunnion 3. In the present instance, the bearing cavity or chamber 25 for the rollers 22 is separated from the forward bearing cavity or chamber 26 for the rollers 23 and friction bearing by means of an elastic O-ring seal 27 which seats in an annular groove 28 in a radial face of the trunnion between the inner raceways for the rollers 22 and 23. The seal ring 27 is radially fixed in the annular groove 28 and slides on the trunnion of the drill bit body 2 as well as on a radial face 29 formed in the rotary cutter 1. The bearing cavity or chamber 25 of the outer roller bearing 22 is sealed from the ambient atmosphere outside of the rotary cutter by means of an edge ring 30 fixed in a bore of the rotary cutter, for example, by means of welding and which in the present instance has a pair of annular grooves on its inner peripheral face in which are seated a pair of axially spaced seal rings 31.

The bearing cavity 26 which usually operates at a relatively high running temperature is filled with a temperature-stable lubricant for the inner roller bearings 23 and the axial friction bearing 24. This lubricant fills the forward bearing cavity or chamber 26 and normally would be flung by centrifugal force during operation into the rear bearing cavity 25, wherein the bearings operate at a lower temperature. However, the seal 27 holds the lubricant in the bearing cavity 26 even during rotation of the rotary cutter and the corresponding centrifugal force effect on the lubricant which would normally take place. The rearward end of the rotary cutter is rather well cooled during operation by the cooling liquid in that area so that the outer rolling bearing 22 runs at a relatively low temperature and consequently the bearing cavity or chamber 25 for the rollers 22 can be filled with a lubricant grease for normal running temperatures.

Figure 3:
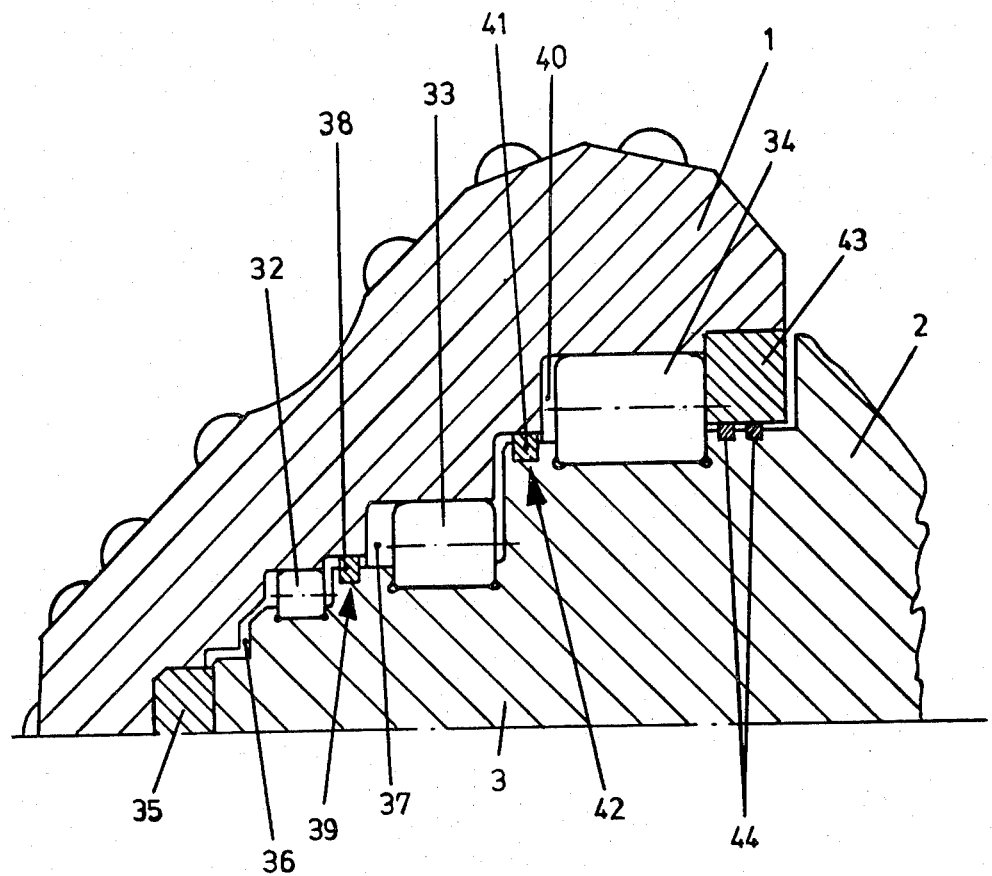
FIG. 3 is a fragmentary sectional view similar to FIGS. 1 and 2 showing a still further modified rotary drill bit in accordance with the present invention.

There is illustrated in FIG. 3 a still further modified form of rotary cutter assembly in accordance with the present invention. In accordance with this embodiment, the rotary drill bit which is radially supported in bearings on the trunnion 3 of the drill bit body by an inner set of rollers 32, a central set of rollers 33 and an outer set of rollers 34. The axial operating pressure of the conically shaped rotary cutter 1 on the trunnion is transferred by an axial friction bearing 35 disposed between the tip of the rotary cutter and the outer axial end face of the trunnion 3. In the present instance, seal means is provided dividing the interior space between the rotary cutter and the trunnion into three distinct bearing cavities or chambers; an inner bearing cavity or chamber 36 for the rollers 32 and friction bearing 35, a central bearing cavity or chamber 37 and an outer bearing cavity or chamber 40 for the rollers 34. In the embodiment illustrated these chambers are separated by piston rings 38 and 41 which slide in annular grooves 39 and 42 of the trunnion as well as in the bore of the rotary cutter 1. The rings 38 and 41 are preferably made of a suitable metal and are axially fixed in the appropriate annular grooves on the trunnion of the drill bit body 2.

An edge ring 43 is mounted in a bore of the rotary cutter 1 and a pair of axially spaced seal rings are mounted in grooves in the trunnion which face the inner peripheral surface of the edge ring to seal the outer chamber or bearing cavity 40.

The bearing cavities or chambers 36, 37 and 40 are filled with different lubricants suitable for the type and size of the bearings and the different running or operating temperatures. As noted above the highest operating temperatures exist in the tip end of the rotary cutter and the lowest at the outer end by reason of the fact that they are cooled during operation by the cooling liquid in that area.

In summary, therefore, the rotary drill bit of the present invention has the distinct advantage that it operates trouble free even with small leakage losses of lubricant and by reason of separating the bearing cavities the high running temperatures are effectively withstood without impairment of lubrication. The assembly thus has a long useful operating life.

Even though specific embodiments of the invention have been illustrated and described herein, it is to be understood that changes and modifications may be made within the scope of the inventive concept as set forth in the accompanying claims. For example, the seals may be axially or radially fixed in an annular groove in the bore of the rotary cutter or in a front face of the rotary cutter instead of in an annular groove of the trunnion. The seals can, moreover, be made as a metallic piston ring and radially elastically braced and fixed on the trunnion of the drilling bit body or in the rotary cutter whereby it then slides and seals in a well-known way on the surface radially facing its sealing surface. Finally, the radial and axial friction bearings of the rotary cutters can be made with coatings of bearing metal of the appropriate surfaces in the rotary cutter and/or on the trunnion of the rotary drilling bit.

What is claimed is:

1. A rotary drill bit comprising a drill bit for minimizing lubricant leakage losses and for withstanding high operating temperatures body and at least one rotary cutter rotatably supported on the drill bit body by a plurality of load carrying bearing assemblies in a cavity between the rotary cutter and drill bit body, at least two seal member means in said cavity, one seal member means sealing said cavity from the outside environment and said other seal member means dividing said cavity into at least two discrete, enclosed chambers for preventing lubricant at the tip of the rotary cutter from being carried by centrifugal force toward the end of the rotary cutter facing the drill bit body, a load carrying bearing assembly in each chamber and a a different non-circulating lubricant in each of said separate chambers, said lubricants being suited for different running temperatures of the bearings in each chamber.

2. A rotary drill bit as claimed in claim 1 wherein said bearing assemblies comprise at least one roller bearing and at least one friction bearing and wherein said other seal member means is disposed between said bearings and defines separate cavities for each bearing.

3. A rotary drilling bit as claimed in claim 1 wherein said other seal member means is arranged slidably on the drilling bit body and in the rotary cutter.

4. A rotary drill bit as claimed in claim 1 wherein said other seal member means is axially fixed in an annular groove of the drill bit body.

5. A rotary drill bit as claimed in claim 1 wherein said other seal member means is radially fixed in an annular groove in the drill bit body.

6. A rotary drill bit as claimed in claim 1 including an edge ring at one end of said rotary cutter remote from the tip of the rotary cutter.

* * * * *